May 19, 1964

R. A. FLOWER 3,134,103

ALTIMETER

Filed Sept. 7, 1962

INVENTOR.
ROBERT A. FLOWER

BY

ATTORNEY.

May 19, 1964　　　R. A. FLOWER　　　3,134,103
ALTIMETER

Filed Sept. 7, 1962　　　　　　　　　3 Sheets-Sheet 2

INVENTOR.
ROBERT A. FLOWER

BY　*H. J. Mackey*

ATTORNEY.

May 19, 1964 R. A. FLOWER 3,134,103
ALTIMETER
Filed Sept. 7, 1962 3 Sheets-Sheet 3

INVENTOR.
ROBERT A. FLOWER
BY
ATTORNEY.

United States Patent Office
3,134,103
Patented May 19, 1964

3,134,103
ALTIMETER
Robert A. Flower, White Plains, N.Y., assignor to General
Precision, Inc., a corporation of Delaware
Filed Sept. 7, 1962, Ser. No. 222,021
5 Claims. (Cl. 343—9)

This invention relates to altimeters for use in aircraft in determining height above the terrain. The invention is especially adapted for use at altitudes below 1000 feet.

The altimeter is designed for use in conjunction with conventional pulsed Doppler automatic ground speed indicating systems, and also employs several components similar to components of such systems. These altimeter components may either duplicate the system components or the system components may be time-shared with the altimeter.

A suitable pulsed Doppler system is described in Transactions of the Professional Group on Aeronautical and Navigational Electronics of the Institute of Radio Engineers, Vol. ANE-4, December, 1957, on pp. 202–211.

Such a Doppler system employs a microwave transmitter, antenna and receiver. The transmitter is pulsed and the receiver is gated off during the transmitting pulses to prevent paralysis or even injury by transmitting energy leakage. The receiver is therefore in condition for receiving the ground echo signals only between the pulses of the transmitter.

This mode of operation precludes, in some cases, the reception of earth echo signals at altitudes below about 1000 feet, if such signals have a round-trip transmission time of less than the duration of one transmitter pulse. This is because the echo received from the front edge of the transmitter pulse arrives while the receiver is still gated off and therefore not in its receptive condition.

The present invention employs a microwave receiver which is gated just oppositely to that described; that is to say, it is receptive during the transmitted pulse periods only, and is gated off during the rest of the time. An additional gating provision is employed to prevent the receiver from being either injured or paralyzed by the transmitter pulse leakage. Special frequency-separation means are employed to perceive, detect and receive the echo signal in the presence of the much larger transmitter pulse leakage, and the time interval between the front of the transmitter pulse and the front of the received echo pulse is measured. This time interval, being proportional to the round trip time of transmission of the microwave energy between the aircraft and the ground, is a measure of the aircraft altitude and is indicated on a dial.

An object of this invention is to provide an aircraft radio altimeter effective at low altitudes.

Another object of this invention is to provide an aircraft altimeter for use in conjunction with existing pulsed Doppler systems and employing common instrumentalities.

Still another object of this invention is to provide an aircraft altimeter having provision for receiving and measuring a microwave echo during the transmitting pulse interval and in the presence of transmitter leakage.

The invention may be more clearly understood by reference to the accompanying drawings, in which.

Figure 1:
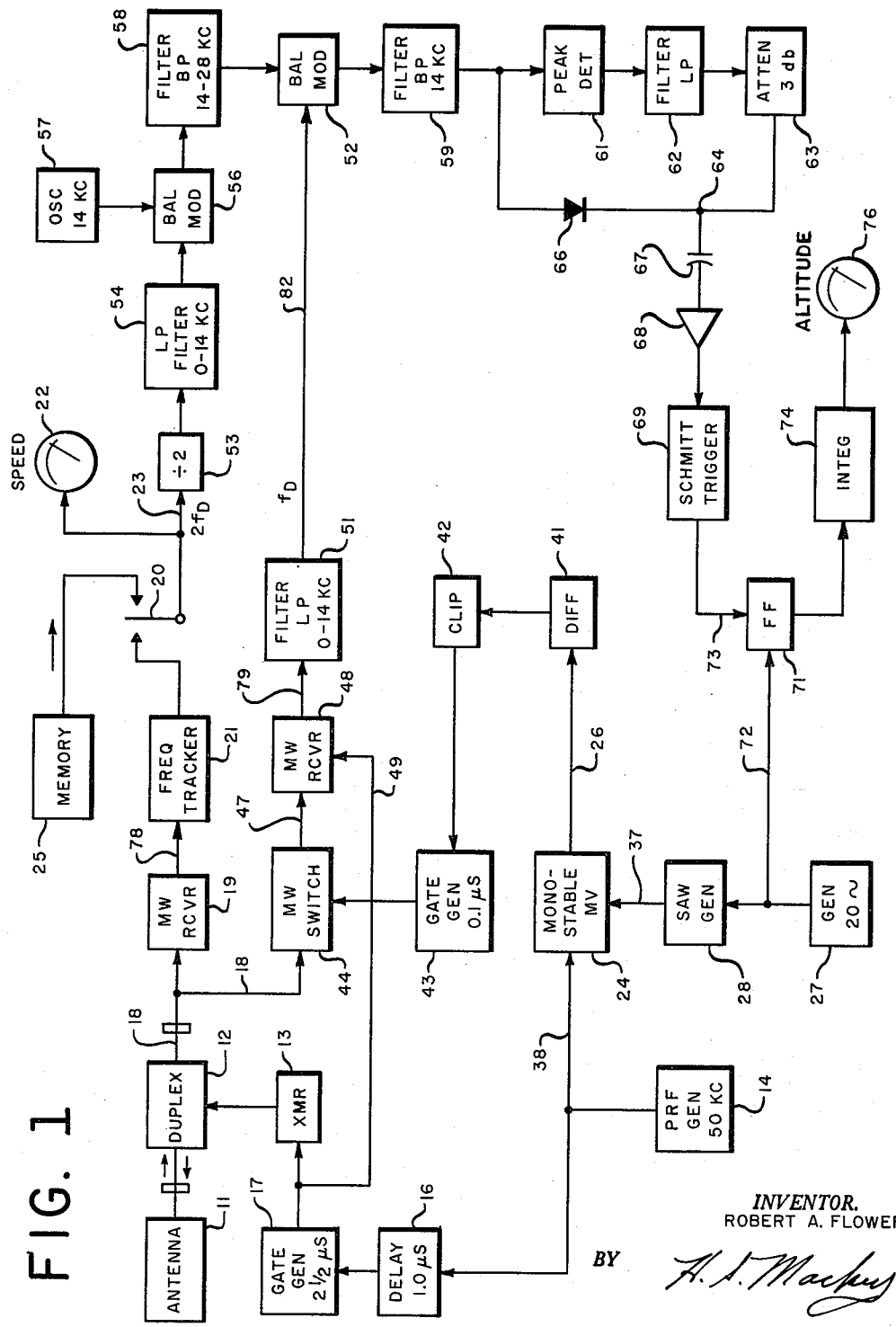
FIG. 1 is a block diagram of an embodiment of the invention.

Referring now to FIG. 1, a microwave Doppler system of the Janus type is provided with antenna 11 which emits several beams of microwave radiation toward the earth, at least one forward and one toward the rear. The antenna is fed through a duplexing circuit 12 from a microwave transmitter 13. The transmitter is pulsed from a pulse repetition frequency generator 14, which may have a frequency of 50 kc.p.s., through a one-microsecond delay circuit 16 and a 2½ µs. gate generator 17. The received signal output terminal 18 of the duplexing circuit 12 is connected to a microwave receiver 19, the output of which is connected to a frequency tracker 21 actuating a dial 22 indicating aircraft speed.

Most of these circuits are components of a conventional pulsed Doppler speed indicating system such as described in the publication referred to above. Its operation is briefly as follows. The antenna 11 emits several narrow beams of pulsed microwave radiation obliquely toward the earth beneath the aircraft. Echoes received from fore and aft beams contain Doppler difference frequencies. From the combined returns of these beams there is secured from the microwave receiver 19 a signal having the frequency $2f_D$, double the Doppler frequency difference of a single beam. When this frequency is multiplied by a constant and divided by the cosine of the angle which a beam makes with the horizontal direction the result denotes the aircraft speed. The signal stated as having the frequency $2f_D$ actually consists of a broad spectrum of frequencies. In order to measure the center frequency of this spectrum and to track it during aircraft speed changes, the frequency tracker 21 is provided. It emits a signal having a single frequency and having power enough to operate the aircraft indicating instrument 22.

The switch 20 denotes switching apparatus operated automatically in accordance with the presence or absence of a usable Doppler signal. If the Doppler signal becomes unusable, the switch 20 connects the input of the indicator 22 to the output of a memory circuit 25, which "remembers" the last-received Doppler signal frequency and applies it to conductor 23.

The signal in conductor 23 containing the speed information is employed in the present invention as are the signals from the generator 14 and from the duplexer 12. The signal from the generator 14 is applied to a monostable multivibrator 24 which emits its pulse output in conductor 26. A 20 c.p.s. generator 27 emits a sharp pulse train which controls a slaved sawtooth waveform generator 28. The generator 28 output is applied to the multivibrator 24 to control the widths of the pulses emitted thereby and applied to the output conductor 26.

Figure 2:
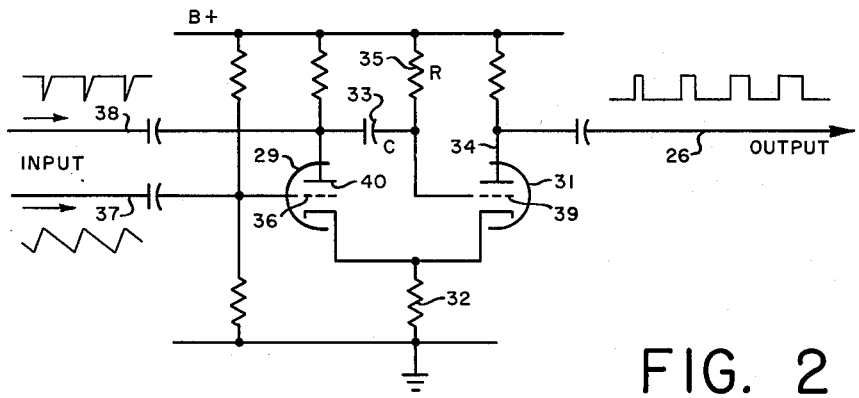
FIG. 2 is the schematic diagram of a monostable multivibrator suitable for use in the invention.

The schematic diagram of this pulse width circuit is shown in FIG. 2. Two triode tubes 29 and 31 are connected by means of a common cathode resistor 32 and a capacitor 33 to form a monostable multivibrator. The output pulse taken from the anode conductor 34 has a width depending on the resistance-capacitance product of resistor 35 and capacitor 33, and also on the potential applied to the grid 36 from conductor 37.

In the absence of inputs, tube 31 conducts and tube 29 is nonconducting. The output potential at conductor 34 therefore is low. The generator 14, FIG. 1, applies sharp negative pulses at 20 µs. intervals, that is, one for each transmitter output pulse, to the input conductor 38, FIGS. 1 and 2, and the generator 28 applies a 20 c.p.s. sawtooth form to the input conductor 37.

When one of the negative PRF pulses is applied through conductor 38 and capacitor 33 to the grid 39 of tube 31, this tube is made nonconductive and the output potential rises, forming the leading edge of an output pulse. Also the tube 29 becomes conductive and the anode 40 drops to a potential determined by the potential of grid 36 which in turn is determined by the existing potential applied by the sawtooth waveform to conductor 37. The potential of grid 39 now rises for a time depending on the potential of anode 40 from which the rise starts, until that point is reached at which tube 31 again starts to conduct, terminating the output pulse. When the next cycle occurs the input sawtooth waveform on conductor 37 will have decreased the potential which it applied to the grid 36, increasing the output pulse width by 0.001 $\mu$sec. Thus the output pulse train consists of pulses having gradually increasing widths, varying from 1.0 $\mu$sec. to 3.5 $\mu$sec. width during sawtooth period encompassing 2500 cycles of operation of the monostable multivibrator. The leading edge of each output pulse of the monostable multivibrator occurs 1.0 $\mu$sec. before the leading edge of a corresponding transmitter pulse. The trailing edge of each pulse occurs at some time between the leading and trailing edge of the transmitter pulse.

The train of pulses of varying width in conductor 26 is applied to a differentiating circuit 41, FIG. 1, then to a clipping circuit 42 which suppresses the positive pulses but transmits the negative pulses. The negative pulse train so produced has a specific but varying delay with respect to the leading edge of the transmitter pulse. This variable delay pulse is applied to a gate generator 43 which emits positive gate pulses having a duration of 0.1 $\mu$s. This generator is started by each negative pulse applied to it from the clipping circuit 42. The positive 0.1 $\mu$s. gate pulse train emitted by generator 43 is applied to operate a microwave switch 44. This switch conducts microwave energy from its input waveguide 18 to its output waveguide 47 for the duration of each 0.1 $\mu$s. pulse applied to it. At all other times this switch inhibits the transmission of microwave energy. The action of the switch is thus to provide a 0.1 $\mu$sec. sample of the energy in waveguide 18 during the time corresponding to each transmitting interval. By the cooperative action of circuits 14, 16, 17, 24, 27 and 28 and 0.1 $\mu$sec. sampling period is caused to sweep repetitively through the 2.5 $\mu$sec. transmitting interval.

The output in conductor 47 is applied to a microwave receiver 48. This receiver is gated in two ways. Its microwave input, being received through the switch 44, consists of the brief 0.1 $\mu$s. gates permitted by the switch 44 to reach the receiver. In addition, the intermediate frequency amplifier portion of the receiver 48 is gated through conductor 49 from the transmitter gate generator 17 so that the amplifier is operative during the 2½ $\mu$s. period of each transmitter pulse, but has no output at other times. The microwave receiver 48 is prevented from being paralyzed by the powerful transmitter leakage entering it along with the received pulse during the transmitter-on period by the extremely brief duration of its input 0.1 $\mu$s. gate, limiting the amount of energy applied. The output from the final detector of the microwave receiver 48 is filtered in a low-pass filter 51 having a cutoff frequency of 14 k.c.p.s., then is applied to a balanced modulator 52.

The output signal of the frequency tracker 21, or of the memory circuit 25, as the case may be, has a single frequency of $2f_D$ and is applied through conductor 23 to a dividing circuit 53, which may be a scale-of-two circuit, dividing the frequency by two and emitting a single-frequency signal of frequency $f_D$. This signal is passed through a low-pass filter 54 having a cutoff frequency of 14 kc.p.s., then is applied to a balanced modulator 56. To this modulator there is also applied a signal at 14 kc.p.s. from a generator 57 and the modulated output is applied to a band-pass filter 58 transmitting the band 14–28 kc.p.s. The output is applied to the balanced modulator 52. The output of this modulator is applied to a narrow-band Doppler filter 59 having a 150 c.p.s. bandwidth centered at 14 kc.p.s. Its output, when plotted in amplitude versus time, is a more or less rounded pulse representing the rise and fall of the echo signal strength, as shown in graph A, FIG. 3. This time variation occurs since the Doppler signal strength is proportional to the product of the instantaneous leakage and echo signals. The 0.1 $\mu$sec. sampling gate causes this instantaneous product to be formed. The slow sweep of the sampling gate (through the period including both leakage and echo signal) thus traces out a replica of the echo pulse envelope, as measured at the Doppler filter output. Because of its narrow bandwidth filter 59 has a slow pulse response time. Hence the sweep rate is only 20 c.p.s.

Figure 3:
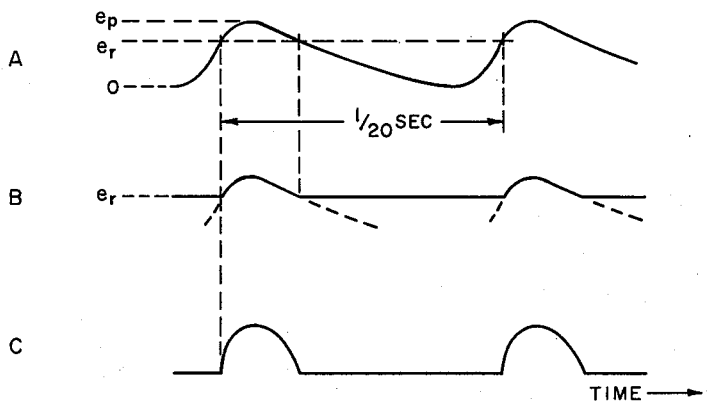
FIGS. 3, 4, 5 and 6 are graphs depicting the operation of the circuits of the invention.

It is desired to mark the effective time of occurrence of the replica of the received echo pulse and to relate this to the time representing the start of the transmitted pulse. It is obvious that definiteness in measuring this time interval is increased by measuring, not to the rounded peak, $e_p$, but to some convenient point on the rising front slope of the pulse. The point selected is that which is 3 db less in intensity than the peak, and is indicated in FIG. 3 by the level $e_r$. This level is selected by applying the output of the filter 59, FIG. 1, to a peak detector 61. The output of the peak detector is passed through a low-pass filter 62 having a time constant at least several times greater than $\frac{1}{20}$ second, so as to "remember" the peak value of amplitude over several cycles of the 20 c.p.s. repetition rate. The output is applied to a 3 db attenuator, 63, emitting a signal amplitude having a maximum 3 db less than that of the peak detector output. This lower signal amplitude is applied to a junction 64.

At junction 64 there is also applied a signal from the filter 59 through a diode 66. So long as the latter signal is less in amplitude than the remembered 3-db-down signal, the diode 66 remains back-biased and is nonconductive. However, when the signal from filter 59 attains the positive potential $e_r$, the diode 66 commences to conduct and the potential of the junction 64 rises above the $e_r$ value as indicated in graph B, FIG. 3. The time of the beginning of this rise is the same as the time of occurrence of the 3 db point on the forward slope of the signal from filter 59. This waveform B is now coupled by a capacitor 67 to an amplifier 68 and the output shown in graph C, FIG. 3, is applied to a Schmitt trigger circuit 69. This circuit is triggered by the initial point of the rise of graph C, so that the front of the rectangular waveform output of the Schmitt trigger circuit signals the desired time. The wavefront is applied to the reset terminal of a flip-flop circuit 71.

The set terminal of the flip-flop circuit 71 is connected to the output of the 20 c.p.s. generator 27. The flip-flop circuit thus emits a pulse starting at the time of the input set pulse applied from conductor 72 and ending at the time of the input reset pulse applied from conductor 73. This flip-flop output pulse, occurring 20 times each second, is applied to an integrator 74, the output of which, being the integrated value of a succession of flip-flop output pulses, is a measure of the average flip-flop pulse width. This is also representative of altitude, and is applied to an indicating instrument 76 calibrated in altitude units.

Figure 4:
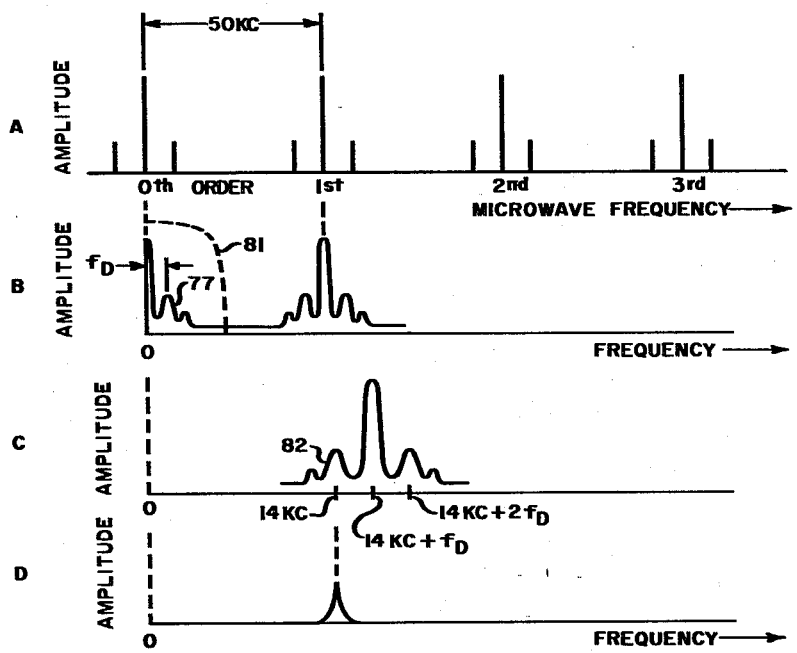

In the operation of this altimeter, in FIGURE 1 the microwave transmitter 13, pulsed at 50 kc.p.s. by the pulse repetition frequency generator 14, emits a spectrum having a zeroeth order at the microwave transmitting frequency and first, second etc., orders extending above and below the transmitting frequency at 50 kc.p.s. intervals. The received signal in conductor 18 includes leakage at these frequencies and, beside each leakage spike, an upper or lower Doppler sideband, depending on the pointing direction of the microwave beam from which the Doppler difference signal is derived. Part of this received spectrum is shown in FIGURE 4, graph A. The received signal in conductor 18 is applied to the microwave receiver 19 where the signals from fore and aft beams are beat together to form in conductor 78, a Doppler spectrum having twice the Doppler difference frequency, or $2f_D$.

The received signal in conductor 18 is also applied, through the microwave switch 44, to the microwave receiver 48. There, since the received signal occurs during the transmitter pulse time and strong transmitter leakage energy is present, demodulation of the separate beam signals occurs by mixing the beam energy with the transmitter leakage energy to form, in conductor 79, a large number of mixer cross-products including the desired Doppler spectrum centered at $f_D$. This is shown in graph B, FIGURE 4. The Doppler spectrum 77, derived from the zeroeth order of the transmitting spectrum, is the one which is to be employed to find altitude. The central frequency, $f_D$, of this Doppler spectrum, proportional to aircraft speed, has a frequency range in this example of zero to 12 kc.p.s. It is the time delay of the buildup of this Doppler spectrum with respect to the start of the 20 c.p.s. timing wave which is measured by the circuits of this invention and which produces the altitude indication.

In order partially to isolate the Doppler spectrum 77, graph B, FIGURE 4, the signal in conductor 79 is applied to the low-pass filter 51 having the range of zero to 14 kc.p.s., adequate to encompass all possible Doppler frequencies. The filter transmission band is shown, not to scale, by the dashed line 81 in graph B.

Returning to FIGURE 1, the Doppler spectrum imposed on conductor 78 having the center frequency of $2f_D$ is applied to the frequency tracker 21 which emits a substantially single-frequency signal at the same frequency, $2f_D$. Either this signal or a signal from the memory device 25, which applies the last-remembered frequency, $2f_D$, to the conductor 23, is halved in frequency, filtered and applied to the balanced modulator 56 as a signal having the pure and isolated frequency of $f_D$. In the modulator the signal is modulated at 14 kc.p.s.

The modulator 56 output contains the sum and difference frequencies, 14 kc.p.s.+$f_D$ and 14 kc.p.s.−$f_D$. In the bandpass filter 58 only the sum sideband is transmitted, applying to the balanced modulator 52 a signal having the single frequency, 14 kc.p.s.+$f_D$. This modulator 52 also receives the signal output from the filter 51 through conductor 82 which includes the frequency $f_D$. Because of the smoothing action of low-pass filter 51, all pulse components related to the repetition frequency of the transmitter have been removed in the signal in conductor 82.

The two inputs to the balanced modulator 52 form upper and lower sidebands in the output at frequencies $f_D$ above and below the carrier 14 kc.p.s.+$f_D$. These sideband signals at frequencies of 14 kc.p.s. and 14 kc.p.s.+$2f_D$, form together with the carrier the three signal frequencies shown in graph C, FIGURE 4. It will be noted that, for any value of $f_D$, the lower sideband is always at 14 kc.p.s., thus permitting the use of a fixed-frequency filter following the modulator.

This fixed-frequency filter 59, being very narrow band, has no difficulty isolating the lower sideband 82 at 14 kc. from the strong leakage spike at 14 kc.+$f_D$, even at low speeds of perhaps 10 miles per hour. It is to be noted that this frequency separation has no relation to the altitude, but only to the aircraft speed. The fixed-frequency filter 59 spectral output is indicated at D, FIGURE 4.

Figure 5:
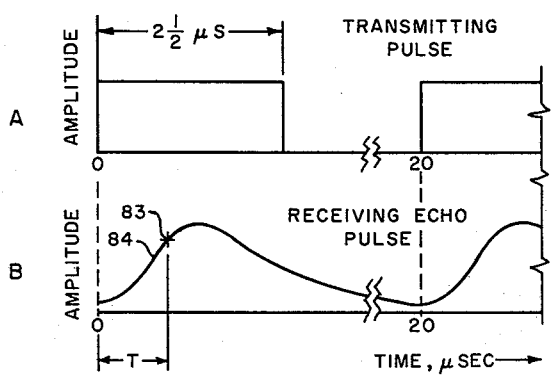
Figure 6:
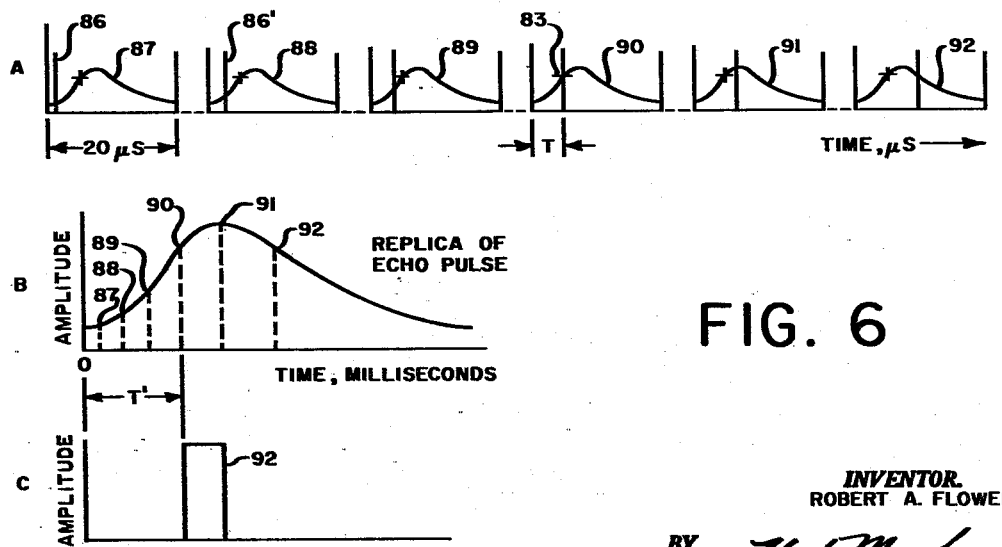

The narrow-band output from filter 59 has a variation with time as described above, shown in FIGURE 3A and more explicitly in FIGURE 5A. FIGURE 5A shows the transmitted pulses, each 2½ μs. long and occurring at 20 μs. intervals, the PRF rate being 50 kc.p.s. It is desired to measure the time interval, T, from the time of the front of the transmitting pulse to the time of occurrence of the 3 db point, 83 on the front of the received signal 84. This is done by taking successive samples as indicated in FIGURE 6A, in which FIGURE 5B is repeated a number of times to a much smaller scale. The several samples of FIGURE 6A are taken several hundred microseconds apart during a single cycle of the 20 c.p.s. sawtooth generator 28. Each sample represents a single received pulse amplitude, plotted against real time. Superimposed is a spike 86 representing a single 0.1 μs. gate of the gate generator 43. In graph 87 the gate 86 is shown near the beginning of the 20 μs. PRF period. In each successive 20 μs. PRF period the 0.1 μs. gate occurs later by .001 μsec., so that 2500 gates later, at the end of ½₀ second, the gate has been retarded until it occurs at the end of the 2.5 μsec. transmitting pulse period. Thus, graph 88 exhibits the situation several hundred microseconds later than that exhibited by graph 87. The 0.1 μs. gate has moved to occur at a later time, 86′. In graphs 89, 90, 91 and 92 the gate has moved to successively later times. The time variation of the output voltage of the Doppler filter, as caused by the action of the gate, is shown in FIGURE 6B.

In graph 91 the gate occurs at the 0.707 or 3 db down point 83. This triggers the Schmitt trigger circuit 69 output pulse, shown in time-amplitude form at 92 in FIGURE 6C. The front of this pulse 92 measures the equivalent time, T′, which is directly proportional to the actual time, T, elapsed since the time of the transmitting pulse front which caused the received pulse (87 through 92).

The front of the Schmitt trigger pulse 92 triggers the flip-flop circuit 71, FIGURE 1, which is retriggered each ½₀ second by the output of generator 27. Thus the pulse output from circuit 71 has a width, as a fraction of the 20 c.p.s. period, which is proportional to the time T, FIGURE 6, as a fraction of the 20 μs. period. The flip-flop output pulse width is therefore a measure of the time interval T′, which is a measure of the echo time of the received pulse, in turn a measure of altitude.

The flip-flop output pulse width is conveniently measured by integrating it in integrator 74, producing an output amplitude proportional to the average pulse width over a number of the 20 c.p.s. cycles. The integrator output is indicated by the indicator 76, which is calibrated directly in altitude units.

What is claimed is:
1. An aircraft altimeter comprising,
   a microwave Doppler speed measuring system including a transmitter connected to a transmitting and receiving antenna through a duplex circuit for emitting microwave pulses, said system deriving a microwave echo signal containing Doppler difference information,
   a microwave receiver gated to be off during intervals between transmitter pulses,
   means generating a series of short gates at intervals slightly greater than the period of said transmitter pulses,
   means operated by said series of short gates during said transmitter pulses for connecting said microwave receiver to said duplex circuit whereby said receiver emits a gated signal spectrum at Doppler frequency,
   and means measuring the average time interval between a selected part of one of said transmitter pulses and a selected part of one of said gated signal spectrums at Doppler frequency, said average time interval being proportional to the altitude of said aircraft above the terrain.
2. An aircraft altimeter comprising,
   a microwave Doppler speed measuring system including a multibeam antenna, a duplex circuit and a transmitter emitting microwave pulses, said system including means for deriving a microwave echo signal containing Doppler difference information,
   a pulse repetition frequency generator having a pulse period for pulsing said transmitter,
   a microwave receiver gated by said pulse repetition frequency generator to be off during intervals between transmitter pulses,
   a gate generator emitting a train of short gates at a period slightly greater than the period of said pulse repetition frequency, means connecting said microwave receiver to said duplex circuit during transmitter pulses at the times of occurrence of said short gates produced by said gate generator, said microwave receiver when gated on emitting moving gate sections of a signal spectrum at Doppler frequency, and means measuring the average time interval between a selected part of one of said transmitter pulses and a selected gate section of one of said signal spectrums, said average time interval being proportional to the altitude of said aircraft above the terrain.

3. An aircraft altimeter comprising, a microwave Doppler speed measuring system including a multibeam antenna, a duplex circuit connected thereto and a transmitter connected to the duplex circuit, said transmitter emitting pulsed microwave radiation, said system additionally including means for deriving a microwave echo signal containing Doppler difference information, a pulse repetition frequency generator having a selected pulse period, connected to pulse said transmitter, a microwave receiver connected to said pulse repetition frequency generator and gated off thereby during intervals between said transmitted pulses, a microwave switch connecting said duplex circuit to the input of said microwave receiver, whereby said microwave echo signal containing Doppler difference information is applied to the receiver when the switch is conductive, a gate generator emitting a train of short gates having a period slightly greater than said pulse repetition period, said gate generator being connected to said microwave switch to render said switch conductive during each short gate, means connected to said microwave receiver for isolating the Doppler echo spectrum of a single beam of said antenna, means measuring the average time interval between the front of one of said transmitter pulses and a selected part of said Doppler echo spectrum of a single beam, and means indicating said measured average time interval, which is proportional to the altitude of said aircraft above the terrain.

4. An aircraft altimeter in accordance with claim 3 in which the short gates emitted by said gate generator are each no longer than one microsecond.

5. An aircraft altimeter comprising, a Janus Doppler speed measuring system including a multibeam microwave antenna, a duplex circuit connected thereto, a transmitter and receiver connected to the duplex circuit, and a frequency tracker connected to said receiver, said system deriving Doppler difference information from microwave echo signals impressed on said receiver, a pulse repetition frequency generator having a selected pulse period, connected to pulse said transmitter, means deriving an output signal from said frequency tracker having a single frequency equal to the Doppler return frequency difference of a single beam of said antenna, a microwave receiver connected to said pulse repetition frequency generator and being gated off thereby during the intervals between said transmitter pulses and connected to said duplex circuit whereby during operating periods of said receiver signal transmitter leakage demodulates the echo signal received from the duplex circuit to emit a Doppler frequency spectrum representing a single beam echo, a microwave switch connected between said duplex circuit and the input of said microwave receiver whereby said microwave echo signal containing Doppler difference information is applied to the receiver when the switch is rendered conductive, a gate generator emitting a train of short gates having a period slightly greater than said pulse period, said gate generator being connected to said switch to render it conductive during each short gate, a fixed frequency filter, means actuated by said single frequency signal and said Doppler frequency spectrum to secure a Doppler spectrum at the frequency of said fixed frequency filter, and means operated by the output of said fixed frequency filter for indicating the time between the start of a transmitting pulse and a selected point on said Doppler spectrum.

References Cited in the file of this patent

UNITED STATES PATENTS

| | | |
|---|---|---|
| 1,924,174 | Wolf | Aug. 29, 1933 |
| 2,404,527 | Potapenko | July 23, 1946 |